Feb. 11, 1958 W. H. DU BOIS 2,822,997
FAIRING SCOOP FOR AIRCRAFT WHEEL
Filed Dec. 17, 1953 3 Sheets-Sheet 1

INVENTOR.
WILLIAM H. DU BOIS
BY
T. H. Murray
AGENT

INVENTOR.
WILLIAM H. DuBOIS

INVENTOR.
WILLIAM H. DU BOIS
BY
T. H. Murray
AGENT

United States Patent Office 2,822,997
Patented Feb. 11, 1958

2,822,997

FAIRING SCOOP FOR AIRCRAFT WHEEL

William H. Du Bois, St. Joseph, Ind., assignor to Bendix Aviation Corporation, South Bend, Ind., a corporation of Delaware Application December 17, 1953, Serial No. 398,675

10 Claims. (Cl. 244—111)

The present invention relates to an air scoop for the side of an aircraft wheel and more particularly to a fairing scoop which will automatically retract into the side of the wheel when the wheel leaves the ground.

In stopping an aircraft after it has initially alighted on the ground, a large amount of energy must be dissipated in the landing wheel brakes in the form of heat. Since the brakes are carried internally of the wheel where air circulation is particularly poor, it is often necessary to provide an auxiliary brake cooling means. Otherwise, the excessive heat produced during brake application might damage the wheel and brake parts especially in the case of fast, heavy aircraft. The problem of brake cooling is complicated by the fact that the wheel and brake assembly must be light and compact to facilitate its retraction into the limited space provided in the aircraft wing or fuselage. Various types of ventilating means have heretofore been incorporated into the wheel structure which are lacking in either cooling efficiency or compactness.

In order to cool the brake efficiently without sacrificing the compactness of the wheel and brake assembly I have provided a novel means for directing an air stream laterally across the interior of the wheel to carry away the heat caused in brake application. This cooling means is in the form of a fairing scoop which is mounted at one side of the wheel to baffle air flowing by the wheel side and direct it inwardly across the wheel. My fairing scoop is such that it will automatically open when the wheel alights on the ground, and likewise automatically retract or collapse into the side of the wheel after the wheel leaves the ground. In this way the bulk of the wheel assembly is reduced as soon as the wheel leaves the ground to facilitate its retraction into the space provided in the aircraft. A further advantage of the invention lies in the fact that the need for pilot control of the fairing scoop is eliminated since the operation of the scoop is automatic.

Other objects and features of my invention will become apparent as the specification proceeds. In the drawings which accompany the description:

Figure 1:
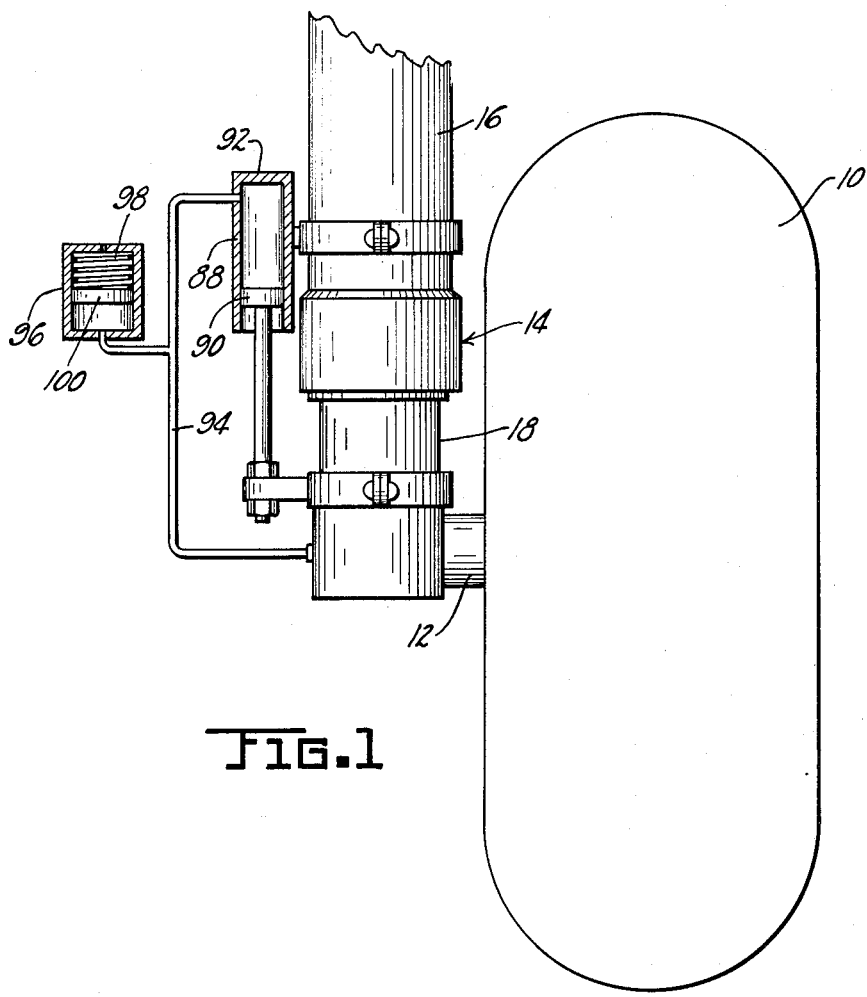
Figure 1 is a view of an aircraft wheel and shock strut showing schematically their relation to the hydraulic actuating means of the present invention.

Referring to Figure 1, an aircraft wheel 10 is shown rotatably supported on a hollow axle 12. The axle, in turn, is carried at the lower extremity of a conventional telescoping shock strut 14. This type of strut is well known in the aircraft art and comprises an outer cylinder 16 together with an inner cylinder 18 which is slidably received within the outer cylinder. Between the cylinders is interposed any sort of cushioning or shock absorbing means so that as the weight of the aircraft is applied to the wheel when the aircraft alights on the ground cylinder 18 will telescope into cylinder 16 to thereby contract the shock strut in length. The extent to which the cylinders telescope (i. e., the amount of contraction) will depend upon the weight load on the wheel.

Figure 2:
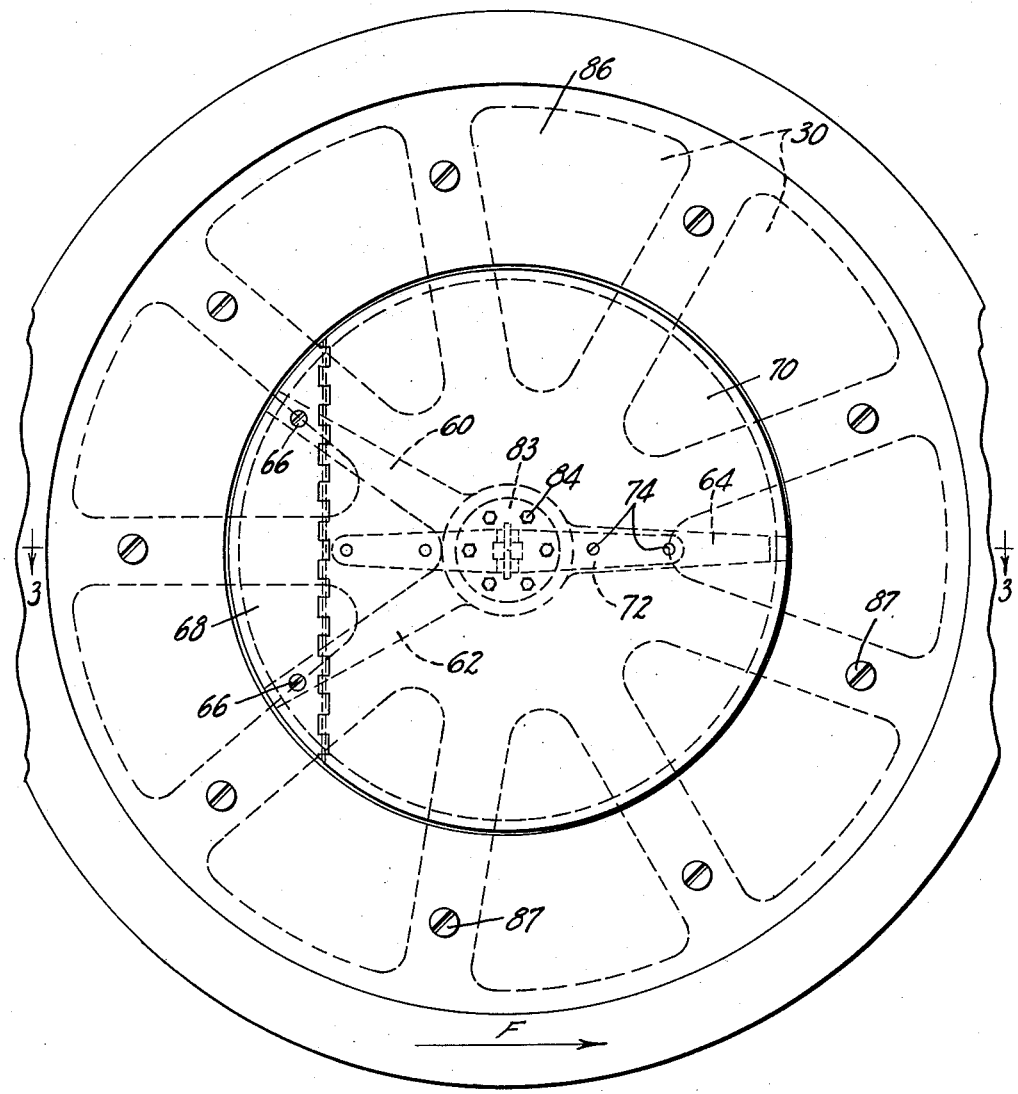
Figure 2 is an outboard side view of the wheel of Figure 1 showing the fairing scoop in its closed position.
Figure 3:
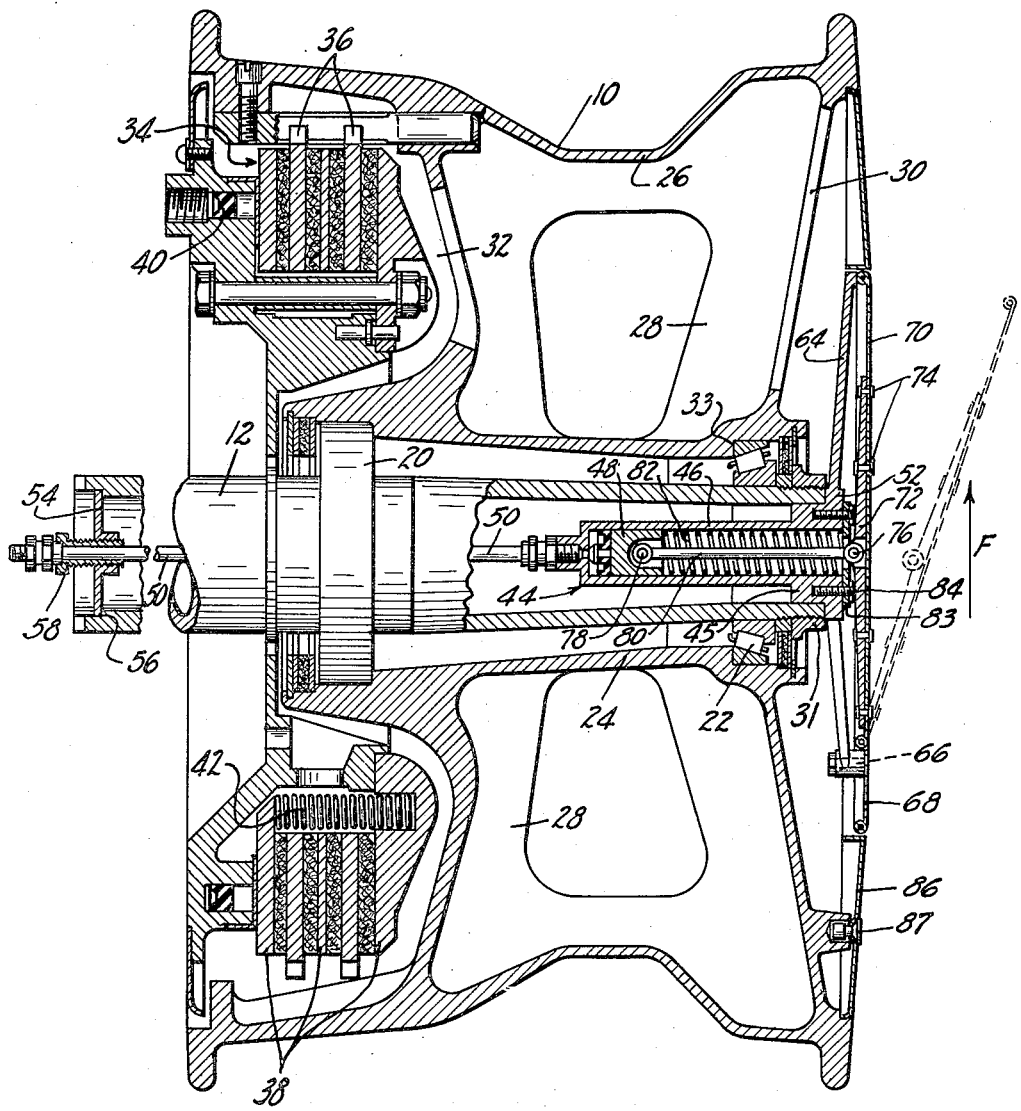
Figure 3 is a sectional view of the wheel and fairing scoop taken along the line 3—3 of Figure 2.

Referring now to Figures 2 and 3, the wheel 10 is supported on axle 12 by a pair of axially spaced bearings 20 and 22. The wheel has an inner hub portion 24 and an outer rim portion 26 which are connected by a plurality of circumferentially spaced spokes or radial support members 28 to thereby form a series of lateral passages 30 (Figure 2) extending across the interior of the wheel. The wheel is held on the axle by a nut 31 which threadedly engages the right end of the axle to hold bearing 22 against shoulder 33. At the left hand or inboard side of the wheel is formed an annular cavity 32 within which is carried any suitable brake 34. In the present embodiment the brake is of the disc type having a plurality of axially movable rotor and stator disc elements 36 and 38 which are keyed to the rotatable and non-rotatable parts of the assembly respectively. The disc elements are brought into frictional engagement by a hydraulic actuator 40. Upon release of fluid pressure applied to the actuator, a plurality of circumferentially spaced return springs 42 force the elements out of frictional engagement to thereby release the brake. Since the brake comprises no part of the present invention, a detailed description is not included herein. However, reference may be made to Du Bois Patent No. 2,423,881 for a complete description of this type of brake.

In Figure 3 it can be seen that disposed within the hollow axle 12 is a fluid motor 44. The fluid motor comprises a cylinder 46 having an enlarged portion 45 fitted into one end of axle 12 together with a piston 48 reciprocable within the cylinder. A fluid pressure conduit 50 extends through axle 12 for connection to the end of the fluid motor as shown. One end of axle 12 is formed for abutment with flange 52 which is integral with cylinder 46, and the other end of the axle is fitted with an end cap or end plate 54 which abuts an associated annular shoulder 56. Cylinder 46 and conduit 50 are held against axial movement between flange 52 and end cap 54 by means of a draw nut 58 which is threadedly received on the left end of the conduit 50 to snugly abut the end plate. Rotational movement of cylinder 46 within axle 12 is prevented by a key, not shown, which fits into a keyway formed between enlarged portion 45 and axle 12.

Integral with flange 52 are three radially outwardly extending support members 60, 62, and 64. Carried on members 60 and 62 by bolts 66 is a plate 68. Vertically hinged to plate 68 is another plate 70 which, together with plate 68, forms a disc-like cover for the center of the wheel. Plate 70 acts as the air baffle for the fairing scoop and has a central, horizontally extending stiffening member 72 which is fastened to the plate by any suitable means such as rivets 74. Between pivot 76 formed in stiffening member 74 and pivot 78 on piston 48 is a linking element 80. A coil spring 82 is interposed between piston 48 and an annular plate 83 which is fastened to the end of cylinder 46 by bolts 84. Movement of the piston to the left due to the action of spring 82 is limited when plate 70 abuts support member 64.

Surrounding plates 68 and 70 is an annular, radially inwardly extending flange 86 which, together with plates 68 and 70, forms a complete side cover for the wheel. Flange 86 is fastened to the rotating part of the wheel 10 by a plurality of fastening elements 87. It is to be understood that although only a single baffle plate is disclosed in the present embodiment, a series of baffle plates can be used alternatively as a shutter.

Referring again to Figure 1, the actuating means for the fairing scoop includes a hydraulic cylinder chamber 88 which is clamped to cylinder 16. An associated piston member 90 is clamped to cylinder 18 so that as weight is applied to the wheel and the shock strut contracts in length, piston 90 will be forced toward end 92 of cylinder 88 thereby forcing fluid pressure through conduit 94. Conduit 94 is, in turn, connected to the threaded left end of conduit 50 shown in Figure 3 so that the actuating means and fluid motor 44 together comprise a closed hydraulic system. Connected to conduit 94 is a conventional compensator 96 which will relieve any excess pressure developed in the actuating means over and above that required to open the fairing scoop.

Operation of the device is as follows: When the aircraft is airborne, cylinders 16 and 18 of shock strut 14 will be in their extended position and the fairing scoop will be closed due to the action of spring 82. However, when the aircraft alights on the ground, the shock strut will contract in length thus forcing piston 90 toward end 92 of cylinder 88. The resulting fluid pressure produced will act on piston 48 to thereby force plate 70 axially outward about its hinge against the action of spring 82. This position is shown in dotted lines in Figure 3. Since the direction of forward movement of the wheel is in the direction of arrow F shown in Figures 2 and 3, plate 70 will now baffle air flowing past the wheel side inwardly across the interior of the wheel through passages 30 to thereby cool brake 34. Plate 70 will remain in its open position until the wheels leave the ground in takeoff at which time strut 14 will extend in length, as will the fairing scoop actuating means, to thereby release fluid pressure applied to piston 48. Spring 82 will now rotate plate 70 axially inward to facilitate retraction of the wheel into the space provided in the aircraft fuselage, not shown. Due to the initial impact in landing and passage over rough and uneven ground surfaces, the extent to which cylinder 18 telescopes into cylinder 16 will vary when the aircraft is on the ground. A corresponding variance will result in the extent of travel of piston 90 within cylinder 88. In order to compensate for the resultant fluctuations in pressure produced, compensator 96 is connected to conduit 94. The strength of spring 82 in fluid motor 44 is less than that of spring 98 found in the compensator so that the initial pressure produced within cylinder 88 will open the fairing scoop. Excess pressure will then be dissipated in compensator 96 by acting on piston 100 and compressing spring 98. Thus, the entire system provides a means for cooling the brake automatically as soon as the aircraft alights on the ground without the need of manual control by the pilot.

Although only one embodiment of my invention has been shown and described in detail, it will be understood by those skilled in the art that various changes in form and arrangement of parts can be made to suit requirements.

Having thus described my invention, what I claim as new and desire to secure by Letters Patent is:

1. An aircraft landing gear assembly comprising a shock strut of the type having a pair of telescoping elements which contract in length when the aircraft alights on the ground, a hollow axle laterally extending from one of said elements, a wheel rotatably supported on said axle, and a fairing scoop assembly for directing an air stream laterally across the interior of the wheel upon movement of the aircraft over the ground, said fairing scoop assembly comprising a fluid motor inserted into one end of said axle, a conduit extending through said axle for connection to said motor, means for holding said motor against axial movement, a radially outwardly extending support member carried at said one end of the axle, a side cover plate for the wheel vertically hinged on said support member, a linkage connecting said motor and side plate whereby actuation of the motor will force the side plate to rotate axially outwardly about its hinge, and fluid pressure producing means for actuating said motor, said latter mentioned means comprising a cylinder chamber connected to one of said elements, a piston member connected to the other of said elements and reciprocable within said cylinder chamber, and a port in one end of the cylinder chamber for connection to said conduit, said piston member being forced toward said one end of the cylinder chamber upon contraction of said telescoping elements to thereby pressurize said conduit and actuate said motor.

2. For use with an aircraft shock strut of the type having a pair of telescoping elements which contract in length when the aircraft alights on the ground, an axle laterally extending from one of said elements, a wheel rotatably supported on said axle, and a fairing scoop assembly for directing an air stream laterally across the interior of the wheel upon movement of the aircraft over the ground, said assembly comprising a fluid motor carried by said axle, a radially outwardly extending support member carried at one end of said axle, a side cover plate for the wheel vertically hinged on said support member, a linkage connecting said motor and said side plate whereby actuation of the motor will force the side plate to rotate axially outwardly about its hinge, fluid pressure producing means for actuating said motor, said latter-mentioned means comprising a cylinder and piston combination connected to said strut between said telescoping elements whereby contraction of the elements will force said piston to move toward one end of its associated cylinder, and a conduit connecting said one end of the cylinder and said motor for conducting fluid pressure produced in the cylinder to said motor.

3. For use with an aircraft shock strut of the type having a pair of telescoping elements which contract in length when the aircraft alights on the ground, an axle laterally extending from one of said elements, a wheel rotatably supported on said axle, and a fairing scoop assembly for directing an air stream laterally across the interior of the wheel upon movement of the aircraft over the ground, said assembly comprising a fluid motor carried by said axle, a conduit connected to said motor, a radially outwardly extending support member carried at one end of said axle, a side cover plate for the wheel vertically hinged on said support member, a linkage connecting said motor and side plate whereby actuation of the motor will force the side plate to rotate axially outwardly about its hinge, fluid pressure producing means connected to said conduit for actuating said motor, and force-transmitting means operatively interconnected between the relatively movable telescopic elements and said fluid pressure-producing means, said latter-mentioned means being such as to produce fluid pressure upon contraction of said strut elements when the aircraft alights on the ground.

4. For use with an aircraft wheel and shock strut of the type having a pair of telescoping elements which contract in length when the aircraft alights on the ground, a fairing scoop assembly for directing an air stream laterally across the interior of the wheel upon movement of the aircraft over the ground, said assembly comprising a support structure carried at one side of said wheel, a side cover for the wheel vertically hinged on said support structure, means for rotating said side cover axially outwardly about its hinge, means for actuating said first-mentioned means, and means combined with said actuating means and telescoping elements whereby relative telescopic movement of said telescoping elements energizes said actuating means responsively to the relative movement of said telescoping elements.

5. For use with an aircraft wheel and shock strut of the type having a pair of telescoping elements which contract in length when the aircraft alights on the ground, a fairing scoop assembly carried at one side of the wheel for directing an air stream laterally across the interior of the wheel upon movement of the aircraft over the ground, said assembly comprising axially outwardly extending means carried at one side of the wheel for directing air passing by said side inwardly across the center of the wheel, means for retracting said axially outwardly extending means to a position which is flush with the side of the wheel, automatic means for positioning said first-mentioned means in its axially outwardly extending position when the wheel alights on the ground, and means operatively combined with said automatic means and telescoping elements whereby said automatic means is actuated responsively to contraction of said telescoping elements.

6. In combination with an aircraft wheel rotatably supported on a hollow axle, a fairing scoop assembly for directing an air stream laterally across the interior of said wheel upon forward movement thereof, said assembly comprising a cylinder chamber inserted into one end of the axle, said chamber having an annular flange formed at one end for abutment with said one end of the axle, an end plate for the other end of the axle, a fluid pressure conduit extending through said cover plate and axle for connection to said chamber, means for holding said chamber and conduit against axial movement between said flange and end plate, a series of radially outwardly extending support members carried on said flange, a side cover plate for the wheel vertically hinged on said support members, a piston reciprocably received in said cylinder chamber, means connecting the piston and side plate whereby fluid pressure applied to the piston through said conduit will force said cover plate to rotate axially outwardly about its hinge, and means associated with the piston for rotating the cover plate axially inwardly upon release of fluid pressure applied to said piston.

7. In combination with an aircraft wheel rotatably supported on a hollow axle, a fairing scoop assembly for directing an air stream laterally across the interior of said wheel upon forward movement thereof, said assembly comprising a cylinder chamber inserted into one end of the axle, a fluid pressure conduit extending through said axle for connection to said chamber, means for holding said chamber and conduit against axial movement, a series of radially outwardly extending support members carried at one end of said chamber, a side cover plate for the wheel vertically hinged on said support members, a piston reciprocably received in said cylinder chamber, and a linkage connecting said piston and cover plate whereby fluid pressure applied to said piston through said conduit will force the cover plate axially outwardly about its hinge.

8. In combination with a stationary axle and a spoked aircraft wheel rotatably supported thereon, a combination side cover plate and fairing scoop assembly for the wheel comprising a support structure carried at one end of said axle, a first plate fastened to said structure in a plane perpendicular to the axis of the axle, a second plate hinged to said first plate whereby the first and second plates form a disc-like covering for the central portion of the side of the wheel which coincides with said end of the axle, an annular, radially inwardly extending flange carried at the outer periphery of said side of the wheel to complete the side cover for the wheel, a fluid motor carried by said axle for rotating said second plate axially outwardly about its hinge to thereby direct air flowing past the side plate laterally across the interior of said wheel, an actuator combined with said fluid motor, and means operatively associated with said actuator for energizing the actuator responsively to aircraft landing.

9. In combination with a stationary hollow axle and a wheel rotatably supported thereon, a cylinder and piston assembly carried within one end of said axle, a source of fluid pressure connected to said assembly, radially outwardly extending arms carried at said one end of the axle, a disc-like member vertically hinged on said arms, a radially inwardly extending flange carried at the outer periphery of the side of the wheel which coincides with said one end of the axle, said flange surrounding the disc-like member, and means connecting said member and piston whereby the member will be rotated axially outwardly about its hinge upon application of fluid pressure to said piston to thereby direct air flowing past the side of the wheel axially inwardly against said side.

10. For use with an aircraft wheel rotatably supported on a hollow axle, a fairing scoop assembly for directing an air stream laterally across the interior of said wheel, said assembly comprising a support structure carried at one end of said axle, a side cover plate for the wheel vertically hinged on said structure, a cylinder and piston combination carried within said axle, a source of fluid pressure connected to said combination, means connecting said piston and cover plate whereby the cover plate will be rotated axially outwardly upon application of fluid pressure to said piston, and means for rotating said cover plate axially inwardly upon release of fluid pressure applied to said piston.

References Cited in the file of this patent

UNITED STATES PATENTS

| | | |
|---|---|---|
| 2,248,684 | Levy | July 8, 1941 |
| 2,555,184 | Butler | May 29, 1951 |
| 2,580,001 | Butler | Dec. 25, 1951 |

FOREIGN PATENTS

| | | |
|---|---|---|
| 654,499 | Great Britain | June 20, 1951 |